United States Patent
Walter et al.

(10) Patent No.: US 11,111,156 B2
(45) Date of Patent: Sep. 7, 2021

(54) PROCESS FOR THE PRODUCTION OF HIGH PURITY IRIDIUM(III)CHLORIDE HYDRATE

(71) Applicant: Heraeus Deutschland GmbH & Co. KG, Hanau (DE)

(72) Inventors: Richard Walter, Alzenau (DE); Jörg Fuchs Alameda, Biebergemünd (DE); Christian Imgrund, Sommerkahl (DE); Christian Neumann, Hungen (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 101 days.

(21) Appl. No.: 16/474,304

(22) PCT Filed: Dec. 4, 2017

(86) PCT No.: PCT/EP2017/081308
§ 371 (c)(1),
(2) Date: Jun. 27, 2019

(87) PCT Pub. No.: WO2018/137815
PCT Pub. Date: Aug. 2, 2018

(65) Prior Publication Data
US 2019/0337819 A1    Nov. 7, 2019

(30) Foreign Application Priority Data
Jan. 25, 2017 (EP) .................. 17152951

(51) Int. Cl.
*C01G 55/00* (2006.01)
*B01D 3/10* (2006.01)

(52) U.S. Cl.
CPC ............. *C01G 55/005* (2013.01); *B01D 3/10* (2013.01); *C01P 2006/80* (2013.01)

(58) Field of Classification Search
CPC ...... C01G 55/005; B01D 3/10; C01P 2006/80
See application file for complete search history.

(56) References Cited

U.S. PATENT DOCUMENTS

| | | | | |
|---|---|---|---|---|
| 3,565,576 A | * | 2/1971 | Patnnetier | .............. C01G 55/00 423/22 |
| 2013/0264198 A1 | * | 10/2013 | Wang | ........................ C25B 1/04 204/290.14 |

FOREIGN PATENT DOCUMENTS

RU    2437838 C1    12/2011

OTHER PUBLICATIONS

International Search Report issued in PCT/EP2017/081308 dated Jan. 1, 2018.
Holleman-Wiberg: Iridium (III) Verbindungen, Lehrbuch der Anorganischen Chemie, 91.-100 Auflage, 1985 (certified English Abstract).
Database WPI Week 201257, 2012, Thomson Scientific, London, GB; AN 2012-A40080, XP002769670, & RU2437838 C1 (Krasy Nonferr Metal WKS Stock Co), 2011, Zusammenfassung.

* cited by examiner

*Primary Examiner* — Ngoc-Yen Nguyen
(74) *Attorney, Agent, or Firm* — Blank Rome LLP

(57) ABSTRACT

Process for the production of high purity iridium(III) chloride hydrate, comprising the steps of:
(1) providing at least one material selected from the group consisting of solid $H_2[IrCl_6]$ hydrate, aqueous, at least 1 wt. % $H_2[IrCl_6]$ solution, and solid $IrCl_4$ hydrate;
(2) adding, to the at least one material provided in step (1), at least one monohydroxy compound selected from the group consisting of monohydroxy compounds that are miscible with water at any ratio, primary monoalcohols comprising 4 to 6 carbon atoms, and secondary monoalcohols comprising 4 to 6 carbon atoms at a molar ratio of Ir(IV):monohydroxy compound=1:0.6 to 1000, and allowing to react for 0.2 to 48 hours in a temperature range from 20 to 120° C., followed by removing volatile components from the reaction mixture thus formed.

11 Claims, No Drawings

PROCESS FOR THE PRODUCTION OF HIGH PURITY IRIDIUM(III)CHLORIDE HYDRATE

This application is a national stage of International Patent Application No. PCT/EP2017/081308, filed Dec. 4, 2017, which claims the benefit of European Application No. 17152951.4, filed Jan. 25, 2017, each of which are incorporated by reference herein in their entirety.

The invention relates to a process for the production of high purity iridium(III) chloride hydrate.

High-purity iridium(III) chloride hydrate is very well-suited as a starting material for the production of a broad range of IR(III)-based complex compounds that can be used as triplet emitters in OLEDs (organic light-emitting diodes).

Iridium(III) chloride hydrate is commercially available, for example as $IrCl_3 \cdot n\ H_2O$ from Heraeus.

Iridium(III) chloride hydrate is an amorphous solid. It can be prepared by reducing iridium(IV) chloride hydrate or $H_2[IrCl_6]$ solution with oxalic acid or hydrazine. These methods have their limits, though, if one aims to produce high-purity iridium(III) chloride hydrate. One of the difficulties is that the iridium(IV) compounds to be reduced may contain an intrinsic small fraction of Ir(III) that varies from batch to batch. Aside from their reducing effect, both oxalic acid and hydrazine tend to undergo decomposition and complex-forming reactions and thus give rise to the contamination of iridium(III) chloride hydrate thus formed by carbon and/or nitrogen that can be detected quantitatively by elemental analysis.

Gmelin's Handbuch der Anorganischen Chemie (Handbook of Inorganic Chemistry), 8th edition, 1939, pages 58-59, reports on a substance represented by formula $IrCl_3 \cdot x\ H_2O$ that can be obtained by boiling down $H_3[IrCl_6]$ solution. Referring to $H_3[IrCl_6]$, the following page 60 states that, while the reduction of $H_2[IrCl_6]$ with alcohol until the deposition of metal commences does in fact lead to solutions that behave like solutions of a complex acid, because the corresponding salts such as $K_3[IrCl_6]$ are produced immediately in the presence of alkali chloride; there was no way though to isolate a substance that corresponds to formula $H_3[IrCl_6]$ or a hydrate. Moreover, reference is made to $IrCl_3 \cdot x\ H_2O$ that has been mentioned previously on page 58.

The present patent application distinguishes between iridium(III) chloride hydrate and high-purity iridium(III) chloride hydrate. The term, "high-purity iridium(III) chloride hydrate", as used herein, refers to a solid iridium(III) chloride hydrate that can be represented by formula $IrCl_3 \cdot x\ H_2O \cdot y\ HCl$, whereby x=1.5 to 5 and y=0 to 1, in particular 0.1 to 0.7, and whose essential feature is that the iridium (total iridium) contained therein comprises ≥99.9% Ir(III) (iridium with an oxidation number of +3) and ≤0.1% Ir(IV) (iridium with an oxidation number of +4). Accordingly, the term, "high-purity", specifically refers to the essentially uniform oxidation state of the iridium contained therein, i.e. +3.

The ≥99.9% Ir(III) and the ≤0.1% Ir(IV) of the high-purity iridium(III) chloride hydrate add up to the total iridium content thereof. In other words, metallic iridium or iridium compounds with iridium oxidation numbers different from +3 or +4 are not present in the high-purity iridium (III) chloride hydrate. Accordingly, the iridium in the high-purity iridium(III) chloride hydrate is basically present completely in the form of Ir(III).

Aside from iridium, hydrogen, chlorine, and oxygen, the high-purity iridium(III) chloride hydrate preferably contains no other elements or at most trace fractions thereof that are basically inevitable for technical reasons. For example, it can contain trace fractions of nitrogen of up to 0.1 wt. % and trace fractions of carbon of up to 0.3 wt. %. Preferably, it contains neither nitrogen nor carbon and/or the constituent amount thereof is below the respective detection limit. The chemical purity of the high-purity iridium(III) chloride hydrate can be determined by means of conventional quantitative elemental analysis. The high-purity iridium(III) chloride hydrate can comprise certain values in the ranges of 50 to 56 wt. % iridium, 1.2 to 2.5 wt. % hydrogen, 9 to 17 wt. % oxygen, and 30 to 34 wt. % chlorine, as determined by means of quantitative elemental analysis.

The invention relates to a process for the production of high purity iridium(III) chloride hydrate, comprising the steps of:

(1) providing at least one material selected from the group consisting of solid $H_2[IrCl_6]$ hydrate, aqueous, at least 1 wt. % $H_2[IrCl_6]$ solution, and solid $IrCl_4$ hydrate;

(2) adding, to the at least one material provided in step (1), at least one monohydroxy compound selected from the group consisting of monohydroxy compounds that are miscible with water at any ratio, primary monoalcohols comprising 4 to 6 carbon atoms, and secondary monoalcohols comprising 4 to 6 carbon atoms at a molar ratio of Ir(IV): monohydroxy compound=1:0.6 to 1000, and allowing to react for 0.2 to 48 hours in a temperature range from 20 to 120° C., followed by removing volatile components from the reaction mixture thus formed.

The at least one material provided in step (1) and the at least one monohydroxy compound are educts.

In step (1) of the process according to the invention, at least one material selected from the group consisting of solid $H_2[IrCl_6]$ hydrate, aqueous, at least 1 wt. % $H_2[IrCl_6]$ solution, and solid $IrCl_4$ hydrate is being provided. Aqueous, at least 1 wt. % $H_2[IrCl_6]$ solution is a preferred material to be provided in step (1).

Solid $H_2[IrCl_6]$ hydrate is commercially available, for example as $H_2[IrCl_6] \cdot H_2O$ from Umicore or as $H_2[IrCl_6] \cdot n\ H_2O$ from Heraeus. Solid $H_2[IrCl_6]$ hydrate represented by formula $H_2[IrCl_6] \times 6\ H_2O$ can be produced, for example, according to G. Brauer, Handbuch der Praparativen Anorganischen Chemie (Handbook of Preparative Inorganic Chemistry), volume 3, Ferdinand Enke Verlag, Stuttgart 1981, page 1735. Solid $H_2[IrCl_6]$ hydrate can contain Ir(III) fractions that vary from batch to batch.

Aqueous, at least 1 wt. % $H_2[IrCl_6]$ solution can comprise an $H_2[IrCl_6]$ content in the range of 1 to, for example, 70 wt. %, preferably of 45 to 53 wt. %. Said aqueous solutions can be produced by dissolving solid $H_2[IrCl_6]$ hydrate in water and/or, preferably, hydrochloric acid. Alternatively, for example the procedure of G. Brauer, Handbuch der Praparativen Anorganischen Chemie, volume 3, Ferdinand Enke Verlag, Stuttgart 1981, page 1735, can be adopted just as well, whereby the evaporation at the end is not continued until solid $H_2[IrCl_6]$ hydrate is formed, but only until the desired concentration of the aqueous $H_2[IrCl_6]$ solution is attained. Aqueous $H_2[IrCl_6]$ solution is commercially available as well, for example from Johnson Matthey at a concentration with an iridium content of >19 wt. %, from Umicore at a concentration with an iridium content of 23 wt. %, and from Heraeus at a concentration with an iridium content of up to 25 wt. %. Aqueous $H_2[IrCl_6]$ solution can contain Ir(III) fractions that vary from batch to batch.

Solid $IrCl_4$ hydrate is commercially available, for example from Umicore as $IrCl_4/IrCl_3 \cdot n\ H_2O$ or from Heraeus as $IrCl_4 \cdot n\ H_2O$. Solid $IrCl_4$ hydrate can contain Ir(III) fractions that vary from batch to batch.

In step (2) of the process according to the invention, at least one monohydroxy compound selected from the group consisting of monohydroxy compounds that are miscible with water at any ratio, primary monoalcohols comprising 4 to 6 carbon atoms, and secondary monoalcohols comprising 4 to 6 carbon atoms is added to the at least one material provided in step (1) at a ratio of 1 mol Ir(IV): 0.6 to 1000 mol monohydroxy compound and this is allowed to react for 0.2 to 48 hours in a temperature range from 20 to 120° C.

Aside from the possible addition of water taking place, it is preferred not to add any further substances to the reaction mixture.

The at least one monohydroxy compound serves as reducing agent with its hydroxyl group being primary or secondary.

For example a corresponding glycol monoether can be used as the at least one monohydroxy compound that is miscible with water at any ratio. Pertinent examples include methoxyethanol, ethoxyethanol, and methoxypropanol. However, the monoalcohols, methanol, ethanol, n-propanol and/or isopropanol, that are miscible with water at any ratio are preferred.

Primary or secondary monoalcohols comprising 4 to 6 carbon atoms can also serve as monohydroxy compound. In this context, the arrangement of the 4 to 6 carbon atoms can be linear, branched, unsubstituted ring-shaped or substituted ring-shaped. Pertinent examples include, in particular, 1-butanol, 2-butanol, and 2-methyl-1-propanol. Further examples are pentanol isomers and hexanol isomers with a primary or secondary hydroxyl group.

Aside from its primary or secondary hydroxyl group and the ether group that may be present in the case of a glycol monoether, the at least one monohydroxy compound contains no further functional group.

The monoalcohols, methanol, ethanol, and isopropanol, that are miscible with water at any ratio are monohydroxy compounds that are preferred to be used in step (2) of the process according to the invention.

The molar ratio of Ir(IV):monohydroxy compound(s) is 1:0.6 to 1000, preferably 1:0.6 to 100, in particular 1:0.6 to 10, specifically 1:1 to 10 or very particularly 1:2 to 10. In order to avoid any misunderstanding, the molar ratios specified herein apply only to Ir(IV) contained in the at least one material provided in step (1). In other words, any iridium contained therein that has an oxidation state different from +4, for example iridium with an oxidation state of +3, is not included in the calculation of the molar ratio.

The reaction temperature in the reaction mixture is 20 to 120° C., preferably 50 to 100° C. This can be done, for example, under reflux conditions, i.e. at reflux temperature. Preferably, step (2) involves stirring. It is preferred to work at normal pressure.

The reaction time can vary in the range of 0.2 to 48 hours depending, in particular, on the type of selected educts and/or reactants, the concentration and molar ratio thereof, and the reaction temperature. The reaction time is preferred to be in the range of 0.5 to 6 hours.

A reduction reaction takes place during step (2). Step (2) has proceeded completely and/or ended before any formation of metallic iridium commences. The formation of metallic iridium can be recognised visually, for example by the precipitation and/or deposition thereof. It is expedient to record the point in time at which the reduction reaction is completed and/or step (2) ends. Preferably, step (2) ends or is terminated at the time the reduction reaction is completed, for example by cooling the reaction mixture and/or in the course of the removal of volatile components from the reaction mixture thus formed, which completes step (2).

The course of the reaction and/or, in particular, the completion of the reaction in terms of the reduction of Ir(IV) to Ir(III) being basically complete can be monitored, albeit not at the highest possible precision, by means of a conventional redox titration that is known to a person skilled in the art. For example, the potentiometric titration of the Ir(IV) titrant with hydroquinone as titrant in hydrochloric acid milieu allows for no more accurate differentiation than determining a ratio of >98% Ir(III): <2% Ir(IV). Accordingly, the reaction parameters, which are preferably to be set in step (2) depending on the at least one material provided in step (1) and the selected monohydroxy compound, cannot be determined at the highest possible precision by means of redox titration. Ultimately, a redox titration allows only for an approximate determination of the completeness of the reaction and/or of the time point, at which the reduction reaction of step (2) is complete.

The course of the reaction and/or, in particular, the completeness of the reaction can be followed and/or monitored by means of ESR spectroscopy (ESR=electron spin resonance) instead of a redox titration. For example, samples can be taken during or at the end or after completion of step (2) and ESR spectroscopy can be used to test for the ratio of Ir(IV): Ir(III). A conventional ESR spectrometer, for example Bruker ESP 300E, can be used. For example, the ESR measurements can be done at the following measuring conditions. Microwave power for example in the range of 2 to 200 µW; fixed microwave frequency for example in the range of 9 to 10 GHz; sample temperature for example in the range of 2 to 300 K, preferably at 4.2 K; continuously varied magnetic field for example in the range of 500 to 10000 G. By correlating the results of the redox titration to the ESR spectra, the applicant was able to determine a linear correlation allowing to deduce that the ESR spectroscopic method allows for the determination of the ratio of Ir(III): Ir(IV) in the reaction mixture or in the reaction mixture formed in step (2) and/or in the product obtained after completion of step (2) at a precision that allows for differentiation of ≥99.9% Ir(III): ≤0.1% Ir(IV).

The selection of the chemical and physical parameters of the process according to the invention, i.e. the type and amount of the educts, the procedure used in the process, and the process conditions and/or process parameters can take place specifically with the aid and/or application of ESR spectroscopy and/or of the aforementioned ESR measuring method such that step (2) of the process according to the invention can proceed to completion and/or ends or can be terminated, before a formation of metallic iridium commences. Accordingly, ESR spectroscopy can be applied for success monitoring in the selection of the chemical and physical process parameters. By keeping constant all but one of the following parameters:

type of the at least one material provided in step (1) in the reaction mixture formed at the onset of step (2);

concentration of the at least one material provided in step (1) in the reaction mixture formed at the onset of step (2);

type of the at least one monohydroxy compound in the reaction mixture formed at the onset of step (2);

concentration of the at least one monohydroxy compound in the reaction mixture formed at the onset of step (2);

molar ratio of Ir(IV): the at least one monohydroxy compound in the reaction mixture formed at the onset of step (2);

reaction temperature reaction time temperature during the removal of volatile components from the reaction mixture formed in the course of step (2)

duration of the removal of volatile components from the reaction mixture formed in the course of step (2)

ESR spectroscopy and/or the aforementioned ESR measuring method can be used to determine how the one variable parameter must be selected appropriately such that step (2) of the process according to the invention can proceed to completion and/or ends or can be terminated, before a formation of metallic iridium commences. In other words, the point in time, at which the reduction reaction is completed, can thus be determined at high precision. In this context, both the constant parameters and the variable parameter are within the respective aforementioned qualitative and/or quantitative selection ranges.

Using ESR spectroscopy, various successful embodiments of the process according to the invention have been developed, which each lead directly to high-purity iridium (III) chloride hydrate, i.e. without requiring one or more cleaning steps during or after the termination of step (2) and without or basically without any formation of metallic iridium taking place. Examples 1 to 4 disclosed in the following are examples of successful embodiments and/or successful embodiments developed as described.

In step (2) or at the end of step (2), i.e. after the reaction proceeded for 0.2 to 48 hours, volatile components are removed from the reaction mixture thus formed. High-purity iridium(III) chloride hydrate is obtained as a solid residue in this context. Volatile components, such as water, hydrogen chloride, unconverted monohydroxy compound(s), and oxidation product(s) of the monohydroxy compound(s), are removed, for example, by distillation or evaporation. This is done, for example, at temperatures in the range of 30 to 120° C., preferably 70 to 100° C., acting from outside on the container containing the reaction mixture thus formed. Preferably, the removal of volatile components is supported by a vacuum, for example through the use of a rotary evaporator. The removal of volatile components and/or step (2) is completed once an amorphous solid with the desired iridium content, i.e. with an iridium content in the range of 50 to 56 wt. %, is obtained. The amorphous solid is high-purity iridium(III) chloride hydrate.

The high purity iridium(III) chloride hydrate thus produced is very well suited as a starting product for the production of 101p-based complex compounds that can be used as triplet emitters in OLEDs.

EXAMPLES

Example 1 (Production of High Purity Iridium(III) Chloride Hydrate)

A total of 86.65 g aqueous $H_2[IrCl_6]$ solution (Ir content 24.8 wt. %) were weighed in a 2000 mL flask, and 22.27 g ethanol were added. The flask was attached to a rotary evaporator and the content of the flask was heated to a temperature of 71° C. The condensate tank was closed such that any condensate produced would reflux. After 4.5 hours at 71° C., the pressure was reduced to 80 mbar and the volatile components were removed for 40 hours at a heating bath temperature of 80° C. An olive-green amorphous solid was obtained as the product. There was no formation of metallic iridium.

Elemental Analysis of the Product:

Iridium: 52.9 wt. %

Hydrogen: 1.6 wt. %

Chlorine: 33.6 wt. %

Oxygen: 11.0 wt. %

The ratio of Ir(III) to Ir(IV) in the product thus obtained, determined by ESR spectroscopy, was ≥99.9%: ≤0.1%.

Further Examples 2 to 4 were treated analogous to Example 1. There was no formation of metallic iridium in any of the examples. The following table shows an overview of Examples 1 to 4.

|  | Example 1 | Example 2 |
| --- | --- | --- |
| Material provided in step (1) | 86.65 g aqueous $H_2[IrCl_6]$ solution (Ir content 24.8 wt. %, 92% Ir(IV):8% Ir(III)) | 86.96 g aqueous $H_2[IrCl_6]$ solution (Ir content 23.0 wt. %, 93% Ir(IV):7% Ir(III)) |
| Monohydroxy compound | 22.27 g ethanol | 4.47 g ethanol |
| Reaction time (h) | 4.5 | 14 |
| Reaction temperature (° C.) | 71 | 73 |
| Duration of the removal of volatile components (h) | 40 | 38 |
| Heating bath temperature (° C.) | 80 (at 80 mbar) | 80 (at 80 mbar) |
| Product data: |  |  |
| Ir (wt. %) | 52.9 | 51.9 |
| H (wt. %) | 1.6 | 2.4 |
| Cl (wt. %) | 33.6 | 32.2 |
| O (wt. %) | 11.0 | 16.8 |
| Ir(III):Ir(IV) (by ESR spectroscopy) | ≥99.9%:≤0.1% | ≥99.9%:≤0.1% |

-continued

|  | Example 3 | Example 4 |
|---|---|---|
| Material provided in step (1) | 40.9 g aqueous $H_2[IrCl_6]$ solution (Ir content 22.0 wt. %, 94% Ir(IV):6% Ir(III)) | 41.46 g aqueous $H_2[IrCl_6]$ solution (Ir content 21.7 wt. %, 93% Ir(IV):7% Ir(III)) |
| Monohydroxy compound | 13.23 g isopropanol | 13.1 g 1-butanol |
| Reaction time (h) | 5.5 | 5 |
| Reaction temperature (° C.) | 70 | 72 |
| Duration of the removal of volatile components (h) | 24 | 26 |
| Heating bath temperature (° C.) | 80 (at 60 mbar) | 80 (at 50 mbar) |
| Product data: |  |  |
| Ir (wt. %) | 53.9 | 54.2 |
| H (wt. %) | 1.4 | 1.4 |
| Cl (wt. %) | 31.8 | 30.7 |
| O (wt. %) | 9.1 | 9.5 |
| Ir(III):Ir(IV) (by ESR spectroscopy) | ≥99.9%:≤0.1% | ≥99.9%:≤0.1% |

The invention claimed is:

1. A process for the production of high purity iridium(III) chloride hydrate having the formula $IrCl_3 \cdot xH_2O \cdot yHCl$, wherein $x=1.5$ to 5 and $y=0$ to 1, the process comprising:
   (1) providing at least one material selected from the group consisting of solid H2[IrC16] hydrate, aqueous, at least 1 wt. % $H_2[IrCl_6]$ solution, and solid $IrCl_4$ hydrate;
   (2) adding, to the at least one material provided in step (1), at least one monohydroxy compound selected from the group consisting of monohydroxy compounds that are miscible with water at any ratio, primary monoalcohols comprising 4 to 6 carbon atoms, and secondary monoalcohols comprising 4 to 6 carbon atoms at a molar ratio of Ir(IV): monohydroxy compound from 1: 0.6 to 1_1000, and allowing to react for 0.2 to 48 hours in a temperature range from 20 to 120° C., followed by removing volatile components from the reaction mixture thus formed.

2. The process of claim 1, whereby the at least one monohydroxy compound is selected from the group consisting of methanol, ethanol, and isopropanol.

3. The process of claim 1, whereby the molar ratio of Ir(IV): monohydroxy compound(s) is from 1: 0.6 to 1:100.

4. The process of claim 1, whereby the reaction temperature is 50 to 100° C.

5. The process of claim 1, whereby the reaction time is in the range of 0.5 to 6 hours.

6. The process of claim 1, whereby step (2) is terminated, before a formation of metallic iridium commences.

7. The process of claim 1, whereby the course of the reaction and/or completion of the reaction is/are monitored by ESR spectroscopy.

8. The process of claim 1, whereby selection of chemical and physical parameters of the process takes place specifically through the application of ESR spectroscopy, such that step (2) ends or can be terminated, before a formation of metallic iridium commences.

9. The process of claim 1, whereby the volatile components are removed by distillation or evaporation.

10. The process of claim 9, whereby the distillation or evaporation takes place at temperatures in the range of 30 to 120° C. acting from outside on the container containing the reaction mixture thus formed.

11. The process of claim 9, whereby the distillation or evaporation takes place supported by a vacuum.

* * * * *